(12) United States Patent
Mitchell

(10) Patent No.: US 10,207,197 B2
(45) Date of Patent: Feb. 19, 2019

(54) PROCESS FOR AMBIENT TEMPERATURE FRACTIONATION AND EXTRACTION OF VARIOUS BIOMASSES

(71) Applicant: Green Extraction Technologies, Brevard, NC (US)

(72) Inventor: Melvin Mitchell, Penrose, NC (US)

(73) Assignee: Green Extraction Technologies, Brevard, NC (US)

( * ) Notice: Subject to any disclaimer, the term of this patent is extended or adjusted under 35 U.S.C. 154(b) by 830 days.

(21) Appl. No.: 14/454,952

(22) Filed: Aug. 8, 2014

(65) Prior Publication Data

US 2015/0041082 A1 Feb. 12, 2015

Related U.S. Application Data

(60) Provisional application No. 61/864,853, filed on Aug. 12, 2013, provisional application No. 61/909,418, filed on Nov. 27, 2013.

(51) Int. Cl.
*B01D 3/14* (2006.01)
*B01J 19/18* (2006.01)
(Continued)

(52) U.S. Cl.
CPC .............. *B01D 3/143* (2013.01); *B01D 3/14* (2013.01); *B01D 11/0238* (2013.01);
(Continued)

(58) Field of Classification Search
None
See application file for complete search history.

(56) References Cited

U.S. PATENT DOCUMENTS 1,951,519 A 3/1934 Milne
2,226,429 A 12/1940 Hall
(Continued)

FOREIGN PATENT DOCUMENTS

WO WO 92/18691 A1 10/1992
WO WO 2006/111604 A1 10/2006
(Continued)

OTHER PUBLICATIONS

Bozell, J. et al., Clean Fractionation of Biomass, U.S. Department of Energy by the National Renewable Energy Laboratory.
(Continued)

*Primary Examiner* — Jacob T Minskey
(74) *Attorney, Agent, or Firm* — F. Michael Sajovec; Williams Mullen

(57) ABSTRACT

The present invention provides a process for fractionating biomass into its individual components. The process includes pretreating a biomass which may include mechanically altering the fibers and/or contacting the biomass with a solvent to provide a fluidized biomass. The pretreated fluidized biomass may be subjected to high frequency pulses and shear forces without denaturing one or more components of the biomass to provide a first liquid fraction and a first fractionated biomass. The first liquid fraction may then be isolated or separated from the first fractionated biomass. The biomass may be separated, isolated or purified into lignin, extractives for use in pharmaceuticals or nutraceuticals, cellulose, hemicellulose, and other sugars and proteins.

30 Claims, 1 Drawing Sheet

(51) Int. Cl.
    *C07G 1/00*           (2011.01)
    *D21B 1/02*           (2006.01)
    *D21B 1/12*           (2006.01)
    *C08B 1/00*           (2006.01)
    *B01D 11/02*         (2006.01)

(52) U.S. Cl.
    CPC ...... *B01D 11/0261* (2013.01); *B01D 11/0273* (2013.01); *B01J 19/18* (2013.01); *C07G 1/00* (2013.01); *C08B 1/003* (2013.01); *D21B 1/02* (2013.01); *D21B 1/12* (2013.01); *B01J 2219/00822* (2013.01); *Y02E 50/17* (2013.01)

(56) References Cited

U.S. PATENT DOCUMENTS

| | | |
|---|---|---|
| 2,697,701 A | 12/1954 | Heritage et al. |
| 3,338,416 A | 8/1967 | Barry |
| 4,269,362 A | 5/1981 | Berggren |
| 4,806,475 A | 2/1989 | Gould |
| 4,991,720 A | 2/1991 | Höglund et al. |
| 5,306,392 A | 4/1994 | Mita |
| 5,458,897 A | 10/1995 | Paré |
| 5,498,766 A | 3/1996 | Stuart et al. |
| 5,704,559 A | 1/1998 | Fröberg et al. |
| 5,730,837 A | 3/1998 | Black |
| 5,813,618 A | 9/1998 | Prew |
| 5,859,236 A | 1/1999 | Burkart |
| 6,302,997 B1 | 10/2001 | Hurter et al. |
| 6,447,815 B1 | 9/2002 | Menon et al. |
| 6,770,168 B1 | 8/2004 | Stigsson |
| 7,396,434 B2 | 7/2008 | Rodriguez Rivera et al. |
| 7,478,773 B2 | 1/2009 | Gingras et al. |
| 7,504,245 B2 | 3/2009 | Kinley et al. |
| 7,658,955 B2 | 2/2010 | D'Amelio, Sr. et al. |
| 7,678,358 B2 | 3/2010 | Eckert et al. |
| 7,842,161 B2 | 11/2010 | van Heiningen et al. |
| 7,892,397 B2 | 2/2011 | Luo et al. |
| 8,013,195 B2 | 9/2011 | McCall et al. |
| 8,038,840 B2 | 10/2011 | Li |
| 8,268,125 B2 | 9/2012 | Retsina et al. |
| 8,404,884 B2 | 3/2013 | Reaney et al. |
| 8,465,559 B2 | 6/2013 | Guay et al. |
| 8,475,627 B2 | 7/2013 | van Heiningen et al. |
| 8,497,091 B2 | 7/2013 | Hanakawa et al. |
| 8,511,595 B2 | 8/2013 | Lindroos et al. |
| 8,585,863 B2 | 11/2013 | Retsina et al. |
| 8,609,379 B2 | 12/2013 | Chheda et al. |
| 8,741,632 B2 | 6/2014 | Lee et al. |
| 8,765,846 B2 | 7/2014 | Balakshin et al. |
| 2002/0132121 A1 | 9/2002 | Palacio et al. |
| 2002/0148575 A1 | 10/2002 | Wingerson |
| 2004/0138445 A1 | 7/2004 | Thorre |
| 2006/0147556 A1 | 7/2006 | Brewer |
| 2007/0128236 A1 | 6/2007 | Erskine |
| 2008/0029233 A1 | 2/2008 | Wingerson et al. |
| 2008/0032344 A1 | 2/2008 | Fallavollita |
| 2008/0295980 A1 | 12/2008 | Hallberg et al. |
| 2008/0317661 A1 | 12/2008 | Eckert et al. |
| 2010/0059609 A1 | 3/2010 | Teeter, Jr. et al. |
| 2010/0119469 A1 | 5/2010 | Wu et al. |
| 2010/0167339 A1 | 7/2010 | Clayton |
| 2010/0325947 A1 | 12/2010 | Ohman et al. |
| 2011/0003370 A1 | 1/2011 | Gordon et al. |
| 2011/0024544 A1 | 2/2011 | Smrha et al. |
| 2011/0100359 A1 | 5/2011 | North |
| 2011/0313141 A1 | 12/2011 | Brooks |
| 2012/0108798 A1 | 5/2012 | Wenger et al. |
| 2012/0197052 A1 | 8/2012 | Matthews |
| 2012/0282383 A1 | 11/2012 | Hassan et al. |
| 2013/0005952 A1 | 1/2013 | Belanger et al. |
| 2013/0202905 A1 | 8/2013 | Blount |
| 2013/0216520 A9 | 8/2013 | Medoff |
| 2013/0224816 A1 | 8/2013 | Elliot et al. |
| 2013/0225855 A1 | 8/2013 | Ryba et al. |
| 2013/0225856 A1 | 8/2013 | Ryba et al. |
| 2013/0288307 A1 | 10/2013 | Medoff |
| 2014/0024093 A1 | 1/2014 | Blackbourn et al. |
| 2014/0045226 A1 | 2/2014 | Wicking et al. |
| 2014/0096830 A1 | 4/2014 | Gastaldo et al. |
| 2014/0121359 A1 | 5/2014 | Thies et al. |
| 2014/0135470 A1 | 5/2014 | Murray et al. |
| 2014/0174680 A1 | 6/2014 | Hawkins et al. |
| 2014/0107353 A1 | 7/2014 | Qiao et al. |
| 2014/0182801 A1 | 7/2014 | Hawkins et al. |
| 2014/0190471 A1 | 7/2014 | Zhang |
| 2014/0196715 A1 | 7/2014 | Torres et al. |
| 2014/0227742 A1 | 8/2014 | Bao et al. |

FOREIGN PATENT DOCUMENTS

| | | |
|---|---|---|
| WO | WO 2010/058185 A1 | 5/2010 |
| WO | WO 2013/144453 A1 | 10/2013 |
| WO | WO 2013/185344 A1 | 12/2013 |
| WO | WO 2014/046543 A1 | 3/2014 |

OTHER PUBLICATIONS

Du, X. et al., Universal Fractionation of Lignin-Carbohydrate Complexes (LCCS) From Lignocellulosic Biomass: An Example Using Spruce Wood. *Plant J.* Apr. 2013, vol. 74, No. 2; pp. 328-338.
Kumar, P. et al., Methods for Pretreatment of Lignocellulosic Biomass for Efficient Hydrolysis and Biofuel Production, *Industrial & Engineering Chemistry Research*, Mar. 20, 2009, 18 pages.
Li, J. et al., Fractionation and Characterization of Lignon-Carbohydrate Complexes (LCCS) From Eucalyptus Fibers. *Holzforschung*. Nov. 2010, vol. 65; pp. 43-50.
Notification of Transmittal of the International Search Report and the Written Opinion of the International Searching Authority, or the Declaration corresponding to International Application No. PCT/US2015/15378 dated May 14, 2015.
Notification of Transmittal of the International Search Report and the Written Opinion of the International Searching Authority, or the Declaration corresponding to International Application No. PCT/US2015/15368 dated May 18, 2015.
Notification of Transmittal of the International Search Report and the Written Opinion of the International Searching Authority, or the Declaration corresponding to International Application No. PCT/US2014/050542 dated Nov. 14, 2014.
Notification of Transmittal of the International Search Report and the Written Opinion of the International Searching Authority, or the Declaration corresponding to International Application No. PCT/US2014/050536 dated Nov. 14, 2014.
Notification of Transmittal of the International Search Report and the Written Opinion of the International Searching Authority, or the Declaration corresponding to International Application No. PCT/US2014/050529 dated Nov. 13, 2014.
Notification of Transmittal of the International Search Report and the Written Opinion of the International Searching Authority, or the Declaration corresponding to International Application No. PCT/US2014/050531 dated Nov. 13, 2014.
International Preliminary Report on Patentablity of the International Searching Authority corresponding to International Application No. PCT/US2014/050542 dated Feb. 16, 2016, USPTO.
International Preliminary Report on Patentablity of the International Searching Authority corresponding to International Application No. PCT/US2014/050536 dated Feb. 16, 2016, USPTO.
International Preliminary Report on Patentablity of the International Searching Authority corresponding to International Application No. PCT/US2014/050529 dated Feb. 16, 2016, USPTO.
International Preliminary Report on Patentablity of the International Searching Authority corresponding to International Application No. PCT/US2014/050531 dated Feb. 16, 2016, USPTO.
Banerjee et al. "Alkaline peroxide pretreatment of corn stover: effects of biomass, peroxide, and enzyme loading and composition on yields of glucose and xylose", *Biotechnology for Biofuels* 4(16):1-15 (2011).

(56) References Cited

OTHER PUBLICATIONS

Banerjee et al. "Scale-Up and Integration of Alkaline Hydrogen Peroxide Pretreatment, Enzymatic Hydrolysis, and Ethanolic Fermentation", *Biotechnology and Bioengineering* 109(4):922-931 (2012).

Kim et al. "Front-end recovery of protein from lignocellulosic biomass and its effects on chemical pretreatment and enzymatic saccharification", *Bioprocess Biosyst Eng.* 36:687-694 (2013).

Sun et al. "Production and extraction of sugars from switchgrass hydrolyzed in ionic liquids", *Biotechnology for Biofuels* 6(39):1-14 (2013).

Xu et al. "Delignification of Switchgrass Cultivars for Bioethanol Production", *BioResources* 6(1):707-720 (2011).

US 10,207,197 B2

PROCESS FOR AMBIENT TEMPERATURE FRACTIONATION AND EXTRACTION OF VARIOUS BIOMASSES

CROSS-REFERENCE TO RELATED APPLICATIONS

This application claims priority to U.S. Provisional Patent Application Ser. No. 61/864,853, filed Aug. 12, 2013 and U.S. Provisional Patent Application Ser. No. 61/909,418, filed Nov. 27, 2013, the disclosures of which are incorporated herein by reference as if set forth in their entireties.

FIELD OF THE INVENTION

The present invention relates to a process of fractionating and/or extracting biomass into its components. Examples of fractions and extractives provided in the process include the extraction, isolation and preparation of lignins, cellulose, hemicellulose, other sugars, proteins, pectins, and extractives for use as pharmaceuticals or nutraceuticals.

BACKGROUND OF THE INVENTION

Natural cellulosic feedstocks are typically referred to as "biomass." Many types of biomass, including wood, paper, agricultural residues, herbaceous crops, and lignocellulosic municipal and industrial solid wastes have been considered as feedstocks for the production and preparation of a wide range of goods. Thus, successful commercial use of biomass as a chemical feedstock depends on the separation of the various constituents thereof. Many steps are often required in production, harvesting, storage, transporting, and processing of biomass to yield useful products. One step in the processing is the separation, or fractionation, of biomass into its major components: hemicellulose, cellulose, and lignin of the biomass. Many approaches have been investigated for disentangling the complex structure. Many of these approaches, however, require the use of harsh, non-environmentally friendly chemicals and/or conditions to break the biomass down into its individual components.

Once separation into components has been achieved, a variety of paths are then opened for further processing of each component into marketable products. For example, the possibility of producing products such as biofuels, polymers and latex replacements, from biomass has recently received much attention. This attention is due to the availability of large amounts of cellulosic feedstock, the need to minimize burning or landfilling of waste cellulosic materials, and the usefulness of sugar and cellulose as raw materials substituting for oil-based products. Other biomass constituents, such as lignins, extractives, and proteins from the natural cellulosic feedstock, also have potential market value.

Thus there is a need for improved systems and methods for separating solid biomass into its constituent components that take into consideration factors such as environmental and energy concerns, efficiency and cost-effectiveness.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

The present invention provides a process for fractionating biomass into its individual components. The process of the invention is readily adaptable to large-scale production and may performed without the use of environmentally unfriendly chemicals and harsh process conditions such as high temperature and pressure. The process includes pretreating a biomass which may include mechanically altering the fibers and/or contacting the biomass with a solvent to provide a fluidized biomass. The pretreated fluidized biomass may be subjected to high frequency pulses and shear forces without denaturing one or more components of the biomass to provide a first liquid fraction and a first fractionated biomass. The first liquid fraction may then be separated, isolated or purified further.

DETAILED DESCRIPTION OF PREFERRED EMBODIMENTS

Figure 1:
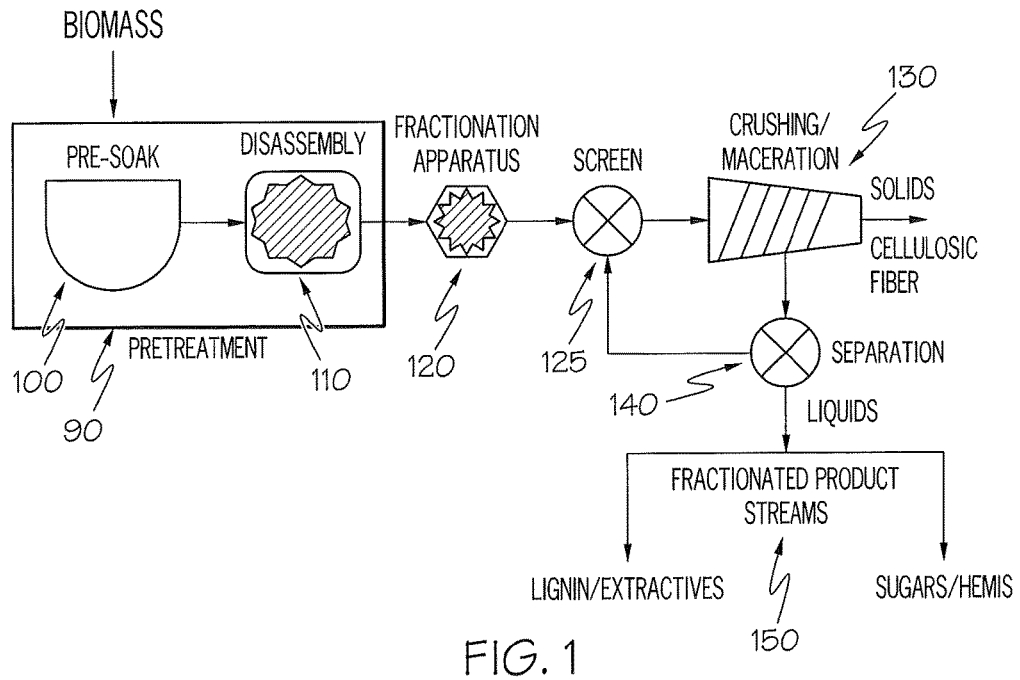
FIG. 1 depicts a flow chart that outlines an embodiment of the process of the invention.

In the following detailed description, embodiments of the present invention are described in detail to enable practice of the invention. Although the invention is described with reference to these specific embodiments, it should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. The invention includes numerous alternatives, modifications, and equivalents as will become apparent from consideration of the following detailed description.

It will be understood that although the terms "first," "second," "third," "a)," "b)," and "c)," etc. may be used herein to describe various elements of the invention should not be limited by these terms. These terms are only used to distinguish one element of the invention from another. Thus, a first element discussed below could be termed a element aspect, and similarly, a third without departing from the teachings of the present invention. Thus, the terms "first," "second," "third," "a)," "b)," and "c)," etc. are not intended to necessarily convey a sequence or other hierarchy to the associated elements but are used for identification purposes only. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

The term "about," as used herein when referring to a measurable value, such as, for example, an amount or concentration and the like, is meant to encompass variations of ±20%, ±10%, ±5%, ±1%, ±0.5%, or even ±0.1% of the specified amount. A range provided herein for a measureable value may include any other range and/or individual value therein.

The term "biomass" includes any non-fossilized, i.e., renewable, organic matter. The various types of biomass may include plant biomass, animal biomass (any animal by-product, animal waste, etc.) and municipal waste biomass (residential and light commercial refuse with recyclables such as metal and glass removed).

The term "plant biomass" or "ligno-cellulosic biomass" includes virtually any plant-derived organic matter (woody or non-woody) available for energy on a sustainable basis. "Plant-derived" necessarily includes both sexually reproductive plant parts involved in the production of seed (e.g., flower buds, flowers, fruit and seeds) and vegetative parts (e.g., leaves, roots, leaf buds and stems). Plant biomass can include, but is not limited to, agricultural crop wastes and residues such as corn stover, wheat straw, rice straw, sugar cane bagasse and the like. Plant biomass further includes, but is not limited to, woody energy crops, wood wastes and residues such as trees, softwood forest thinnings, barky wastes, sawdust, paper and pulp industry waste streams, wood fiber, herbal plant material brewing wastes, and the like. Additionally grass crops, such as switchgrass, wheatgrass, and the like have the potential to be produced in large-scale amounts and to provide a significant source of another plant biomass. For urban areas, the best potential plant biomass feedstock comprises yard waste (e.g., grass clippings, leaves, tree clippings, brush, etc.) and vegetable processing waste.

The biomass comprises three basic chemical components/fractions, namely hemicellulose, cellulose, and lignins. The biomass may also include lesser amounts of proteins, extractives, pectins, and ash depending on the biomass. Specifically, hemicellulose is a polymer (matrix polysaccharide) comprising the pentose and hexose sugars xylon, glucuronoxylon, arabinoxylon, glucomannan, and xyloglucan. The sugars are highly substituted with acetic acid, and because of its branched structure, hemicellulose is amorphous. Hemicellulose is also easy to cleave via hydrolysis. In contract, cellulose is a linear polymer (polysaccharide) of glucose sugars bonded together by β-glycosidic linkages to form lengthy linear chains. Hydrogen bonding can occur between cellulose chains results in a rigid crystalline structure which is resistant to cleavage. Lignin is a polymer of phenolic molecules and is hydrophobic. It provides structural integrity to plants, i.e., it is the glue that maintains the plant intact.

Typical ranges of hemicellulose, cellulose, and lignin in, for example, a plant biomass such as corn stover are:

| Component | Biomass Dry Weight |
|---|---|
| Cellulose | 30-50% |
| Hemicellulose | 20-40% |
| Lignin | 10-25% |

"Ambient temperature" includes the temperature of the surroundings in which the process of the invention takes place. Ambient temperature may include, but is not limited to, "room temperature," and any temperature within the range of 10 to 40° C. (50 to 104° F.).

"Alcohol" includes, but is not limited to, methanol, ethanol, isopropanol, propanol, isobutanol and butanol. A "short chain alcohol" generally includes $C_1$ to $C_4$ alcohols.

"Water" includes, but is not limited to, deionized water, spring water, distilled water, tap water and well water, and mixtures thereof.

Referring now to FIG. 1, operations for the fractionation and extraction of various biomasses, according to some embodiments of the present invention, will be described. A pretreatment step 90 may be conducted optionally at ambient temperature. The biomass may be subjected to a pre-soak step 100 and/or disassembly step 110. The pre-soak step 100 may include contacting with a solvent. The disassembly step 110 may include mechanical disassembling of the biomass to provide the biomass in a fluidized or flowable state or condition. After the pretreatment step 90, the biomass may be subjected to high frequency pulses 120 and high shear forces to fractionate or extract via, for example, the biomass fractionation apparatus and methods described in co-pending U.S. patent application Ser. No. 14/454,833, filed on Aug. 8, 2014, the disclosure of which is incorporated by reference in its entirety. Such fractionation does not denature the one or more components of the biomass. Stated otherwise, the pulsation and shear forces avoid altering the chemical characteristics of the individual components. The fractionated step using high frequency pulses and high shear forces 120 provides a fraction or extraction product and a fractionated or extracted biomass. The fraction or extraction product and fractionated or extracted biomass may be subjected to separation, namely filtration or screening 125 with or without agitation, which separates the fraction or extraction product from the fractionated or extracted biomass. Following the filtration step 125, the fractionated or extracted biomass may be subjected to a compression force 130, and then followed by additional filtration and/or separation with or without agitation 140 to separate additional fractions or extraction products. The fractions or extraction products may be used to provide a desired product stream 150. It is noted that an initial fraction or extraction product may be collected at earlier points of the method and such previously collected fraction combined with the fraction or extract product stream.

As briefly discussed above, in an initial pretreatment step 90 the biomass may be pre-soaked and contacted with a solvent such as with an alcohol, an aqueous alcohol, water or glycerin or co-solvent or mixture thereof in order to begin the fractionation or extraction of the biomass. The biomass may swell during this pretreatment step 90. The biomass may then be disassembled 110 such as by chopping, cutting, fraying, attrition or crushing prior to contact with the solvent 100. In a particular embodiment, if the biomass is, for example, fresh plant biomass or herbal plant material, the material may be contacted with alcohol. If the biomass is dried plant biomass or herbal plan material, it may be contacted with an aqueous alcoholic solution. This aqueous alcoholic extraction may be performed in aqueous alcohol at different concentrations. Suitable alcohols may be short chain alcohol, such as, but not limited to, methanol, ethanol, propanol, isopropanol, butanol and isobutanol. In a particular embodiment, the alcohol is ethanol. The alcohol may be a co-solvent mixture such as a mixture of an alcohol and water. The aqueous alcoholic solution may comprise from 0-100% (v/v) alcohol. More particularly, the aqueous alcoholic solution may comprise from 25-95% (v/v) alcohol. In a particular embodiment, the aqueous alcoholic solution is 25% (v/v) or more alcohol. In another particular embodiment, the aqueous alcohol may be 60% (v/v) alcohol. In another embodiment, the aqueous alcoholic solution may be 70% (v/v) alcohol. In yet another embodiment, the aqueous alcoholic solution may be 86% or more (v/v) alcohol. In yet other embodiments, the process for fractionating or extracting biomass may comprise contacting the biomass with glycerin or an aqueous glycerin solution. In yet another embodiment, the process for extracting biomass may comprise contacting the biomass with water. Typically, in other embodiments of the invention, the ratio of biomass/solids contacted with a solvent/liquids used may be 1:1 to 1:10 of solids to liquid. During contact with the solvent (alcohol or water) the fibers of the biomass may swell.

With respect to disassembling the fibers, the fibers are opened up by chopping, cutting, fraying, attrition or crushing the biomass and are thereby provide the biomass in a fluidized or flowable form. For example, the biomass fibers may be processed in a mechanical high consistency fluidization machine such as a refiner or disk mill. An exemplary disk mill is available from Sprout Waldron, Beloit or Andritz. By utilizing a refiner or disk mill, the biomass and particularly the fibrous material thereof may be altered without destroying the fibrous nature of the fibrous material so that the high frequency pulses and shear forces of the fractionation apparatus are accessible to the fibrous material. The processing may take place for any amount of time necessary as would be understood by one of skill in the art as necessary to affect this step. In a particular embodiment, the disassembly process is performed for one minute or less.

The overall pretreatment step 90 may take place for any period of time that is sufficient for the fractionation or extraction process and may take place in any vessel, container or mixer suitable for contacting the biomass with a solvent and/or disassembling the fibers. In some embodiments, the pretreatment step may be any length of time between, for example, 15 minutes, 30 minutes or one hour, and 72 hours. In another embodiment, the pretreatment step may be 15 minutes or less. The pretreatment step may be one minute or less. In the pretreatment step, the biomass in contact with the solvent may optionally be subjected to a compressive force, which can facilitate absorption of the solvent into the biomass. The compression in the pretreatment step 90 may take place according to any technique that will be appreciated by one of skill in the art. In an embodiment of the invention, compression during the pretreatment step may be affected by a screw press.

In another embodiment, the pretreatment may include the addition of an acid to prehydrolyze the biomass to facilitate removal of the hemicellulose. Suitable acids for acidifying the pretreatment solution (solvent) include inorganic acids such as nitric acid, hydrochloric acid and phosphoric acids, and organic acids, such as acetic acid or formic acid. If acidification/hydrolysis is desired, the pH of the solution will be about 0.5 to 7.0 and often may be between about 1.0 to 5.0. A sequestering agent or chelating agent such as an aminocarboxylic acid or aminopolyphosphoric acid may also be used.

Additionally a compound to help catalyze delignification may be included. In one embodiment an anthraquinone (AQ) may be utilized. Exemplary anthraquinones and derivatives thereof including 1-methylanthrazuinone, 2-methylanthraquinone, 2-ethylanthraquinone, 2-methoxyanthraquinone, 2,3-dimethylantraquinone, and 2,7-dimethylantraquinone.

In another embodiment an alkaline buffer such as an alkaline metal hydroxide carbonate phosphate or boron may be included. Suitable hydroxides include sodium hydroxide, calcium hydroxide, magnesium hydroxide, sodium carbonate, and sodium borate. Mixtures or blends of the hydroxides may be used. If an alkaline metal hydroxide is added, the pH may be between about 7.0 to 13.0 and often may be between about 8.0 to 11.0.

The pretreatment step 90 may be conducted at ambient temperature, elevated temperature (30° C. to 90° C.) or using steam/vapor (greater than 100° C.).

Overall the desire is to provide the fibers in a form wherein the components of the fibers can be readily fractionated using the high shear forces and pulses of the fractionation apparatus. The selection of the conditions of the pretreatment step 90 such as solvent choice, temperature, pressure, time, additives, and the like will be dependent on the biomass and the components of that biomass to be fractionated and isolated, and will be within the skill of one in the art without undue experimentation.

Following disassembly 110, the biomass is in fluid or flowable form may be subjected to fractionation 120 to fractionate or extract the biomass using shear forces and pulsation. It will be appreciated that in a particular embodiment, shear forces and pulsation are used in which the components of the biomass are not denatured or altered, and the chemical properties of the individual components are maintained wherein a portion of the fractions or extracts may be separated from the biomass. The subjecting of the biomass to shear forces and high frequency pulses may take place for any amount of time necessary as would be appreciated by one of skill in the art as necessary to affect this step. In a particular embodiment, this step may takes place for one minute or less. In operation the fluidized biomass is rapidly accelerated from about 4 mph to about 120 mph under greater than 1000 pulses per second of energy while avoiding attrition of the biomass particles. This facilitates the ability of the cellular structure of the biomass to release its various fractions or constituents from the complex and entangled structure of the biomass without having the chemical properties and characteristics of the components being denatured.

Following fractionation 120, the biomass is then subjected to filtration or screening 125 with or without agitation, and as a result provides a fraction or extraction product separated from the fractionated or extracted biomass material. The fractionated biomass material may then be subjected to a compression force 130, e.g., a crushing or macerating force optionally in the presence of additional solvent, wherein the compression force removes liquid fraction for collection while discharging a low liquid solids cake primarily being cellulose. The compression force may be applied according to any technique that is appreciated by one of skill in the art. In a particular embodiment, the compression force is affected by screws of a screw press that macerate the fractionated biomass. A second fraction or extract separated from the previously fractionated or extracted biomass may be provided from this compression step. In another embodiment of the invention, the biomass may be contacted with additional solvent and subjected to a second compression force to provide a second extract. The compression of this step may take place for any amount of time necessary as would be appreciated by one of skill in the art as necessary to affect this step.

The liquid fraction or extract from the compression step and fractions or extracts from previous steps may be combined and filtered 140 with or without agitation to remove any remaining fibers to provide a filtrate or fractionate. The filtering/screening of the extracts may be performed by any method known to one of skill in the art with any device that is suitable for filtering and removing any remaining solid matter from the extract. The fractions or extracts provided from the process according to the invention may be used to provide a desired fraction or extractive product stream 150. The product stream provided will be dependent upon the starting biomass and the pretreatment step solvent used in the fractionation or extraction process. For example, in an embodiment of the invention, fractionation or extraction of lignins or medicinals may be provided if the solvent is ethanol or aqueous ethanol. In another embodiment, fractionation or extraction of sugars or hemicellulose may be provided if the solvent is water. The liquid fraction may further be separated, isolated or purified using membranes (e.g., based on molecular weight), centrifugation, precipitation, and the like to provide the one or more components in substantially purified form.

Figure 2:
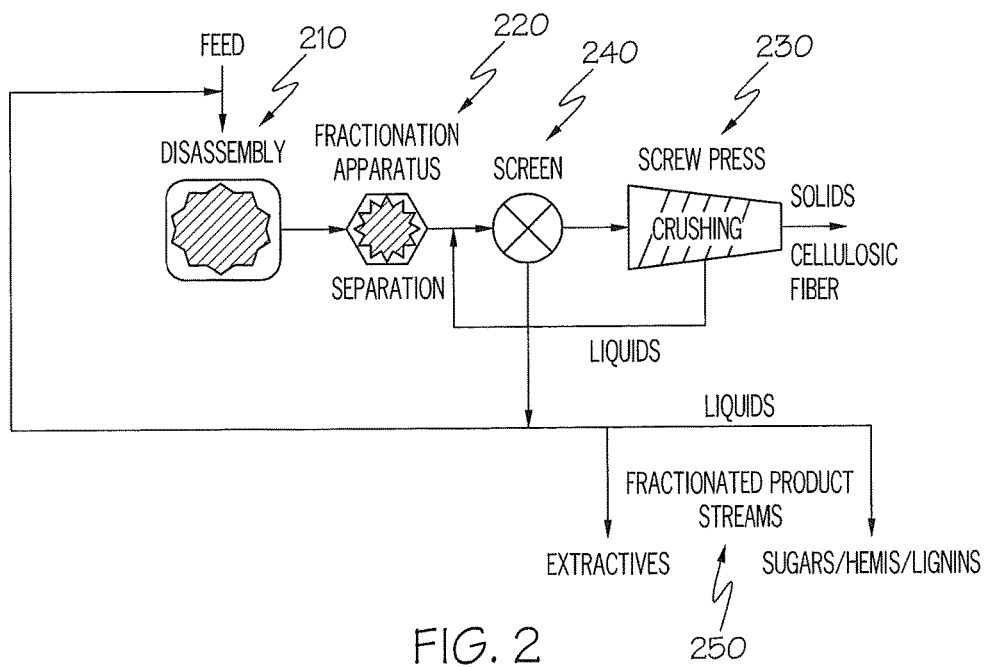
FIG. 2 depicts a flow chart that outlines another embodiment of the process of the invention.

The fractions or extracts provided according to the present invention may be further processed as outlined in FIG. 2. The screened liquids (e.g., liquid fractions) can be contacted with additional biomass, the biomass disassembled 210, fractionated 220, screened 240, subjected to a compressive force 230, and the solid fractionated biomass primarily being cellulosic and the liquid fractionated product stream separated 250. In one particular embodiment, when the fraction is isolated from a biomass high in cellulose, the fractionated biomass can be rendered into pulp for paper or chemical manufacture.

The separated, isolated or purified individual components may be used in a wide variety of ways. Lignin provided in accordance with embodiments of the present invention may be used in the preparation of products such as coatings and adhesives. In a further embodiment, fractionation or extraction provides sugars and/or hemicelluloses. Sugars, cellulose and/or hemicelluloses provided in accordance with embodiments of the present invention may further be used in the preparation of biofuels such as ethanol or the preparation of polymers/plastics. The fraction may be used as a feedstock to provide additional products or used directly. For example, another embodiment is the fermentation of the provided fractions to produce the ethanol. In another embodiment, the polymer is polylactic acid (PLA). In another embodiment the lignin may be further separated for further processing. Because the lignin has not been submitted to high temperatures, its functional groups have not chemically reacted and the isolated lignin may be more reactive. In an embodiment, the further refining and processing may provide pulp (cellulose) suitable for paper products and/or paper coatings. In yet another embodiment, the fractions or extractives provided may be used in paint additives. In yet another particular embodiment, the biomass is herbal plant material. The herbal plant material for extraction is provided in the form of whole leaf, stem, stalk, root and the like, and is ground or cut prior to treatment. The herbal plant material can be organic, cultivated, or wild. Suitable herbal plant materials include, but are not limited to, kava kava, echinacea, St. John's wort, valerian root, milk thistle seed, Siberian ginseng, nettle leaf, ginkgo, gotu kola, ginkgo/gotu kola supreme, astragalus, goldenseal, dong quai, ginseng, St. John's wort supreme, echinacea/goldenseal supreme, bilberry, green tea, hawthorne, ginger, turmeric, black cohosh, cats claw, chamomile, dandelion, chaste tree berry, feverfew, garlic, horse chestnut, licorice, eyebright, yohimbe, astragalus supreme, valerian poppy supreme, and serenity elixir. In some embodiments of the present invention, herbal plant material or tea leaves may be extracted at ambient temperature without heating.

Although selected embodiments of the present invention have been disclosed for illustrative purposes, those skilled in the art will appreciate that various modifications, additions and substitutions are possible, without departing from the scope and spirit of the invention as disclosed in the accompanying claims.

That which is claimed is:

1. A process for fractionating biomass into one or more components of the biomass, the process comprising:
   a) pretreating the biomass to provide a fluidized biomass;
   b) subjecting the pretreated fluidized biomass to simultaneous high frequency pulses and shear forces without denaturing one or more components of the biomass to provide a first liquid fraction and a first fractionated biomass, wherein the high frequency pulses pulse the biomass between about 900 and about 1900 times over the period of about 1.5-3.0 seconds; and
   c) isolating the first liquid fraction from the first fractionated biomass.

2. The process of claim 1, further comprising step d) of subjecting the first fractionated biomass to the same high frequency pulses and shear forces of step b) to provide a second liquid fraction and a second fractionated biomass isolated from each other.

3. The process of claim 1, wherein step c) of isolating the first liquid fraction from the first fractionated biomass comprises applying a compressive force to the first fractionated biomass.

4. The process of claim 2, including applying a compressive force to the second fractionated biomass.

5. The process of claim 2 wherein the first liquid fraction and the second liquid fraction are filtered and combined.

6. The process of claim 2, wherein the first liquid fraction and the second liquid fraction are subjected to membrane separation based on molecular weight to provide one or more components of the biomass in substantially purified form.

7. The process of claim 1 wherein the steps are conducted at ambient temperature.

8. A process for fractionating biomass into one or more components of the biomass comprising:
   a) mechanically altering the fibers of the biomass and optionally contacting the biomass with a solvent to provide a fluidized biomass;
   b) subjecting the fluidized biomass to simultaneous high frequency pulses and shear forces without denaturing one or more components of the biomass to provide a first liquid fraction and a first fractionated biomass, wherein the high frequency pulses pulse the biomass between about 900 and about 1900 times over the period of about 1.5-3.0 seconds; and
   c) isolating the first liquid fraction from the first fractionated biomass.

9. The process according to claim 8, wherein the solvent is any one selected from a group consisting of a short chain alcohol, glycerin and water, or a co-solvent mixture of any combination thereof.

10. The process according to claim 8, wherein the solvent is ethanol or aqueous ethanol.

11. The process of claim 8, wherein the solvent is water.

12. The process according to claim 8, wherein the high frequency pulses are at least 1000 pulses per second.

13. The process according to claim 8, wherein the fraction comprises a component that is any one selected from the group consisting of hemicellulose lignin, extractives and proteins, fibers, or any combination thereof.

14. The process according to claim 8, wherein the biomass is an herbal plant material.

15. The process according to claim 14, wherein the herbal plant material is selected from the group consisting of kava kava, echinacea, St. John's wort, valerian root, milk thistle seed, Siberian ginseng, nettle leaf, ginkgo, gotu kola, astragalus, goldenseal, dong quai, ginseng, bilberry, green tea, hawthorne, ginger, turmeric, black cohosh, cats claw, chamomile, dandelion, chaste tree berry, feverfew, garlic, horse chestnut, licorice, eyebright, yohimbe, and valerian poppy.

16. A process for extracting biomass, the process comprising:
   a) pretreating the biomass to provide a fluidized biomass;
   b) contacting the fluidized biomass with a solvent;
   c) subjecting the fluidized biomass contacted with the solvent to simultaneous high frequency pulses and to shear forces without denaturing one or more components of the biomass to provide a first extract and an extracted biomass, wherein the high frequency pulses pulse the biomass between about 900 and about 1900 times over the period of about 1.5-3.0 seconds;
   d) subjecting the extracted biomass to a crushing force while in contact with additional solvent to provide a second extract separated from the previously extracted biomass; and
   e) combining the first extract and the second extract together.

17. The process according to claim 16, wherein further comprising the step f) of filtering the combination of the first extract and the second extract to remove any solid materials.

18. The process according to claim 16, wherein each of the steps is conducted at ambient temperature.

19. The process according to claim 16, wherein the solvent is any one selected from a group consisting of a short chain alcohol, glycerin and water, or a co-solvent mixture of any combination thereof.

20. The process according to claim 16, wherein the solvent is ethanol or aqueous ethanol.

21. The process of claim 16, wherein the solvent is water.

22. The process according to claim 16, wherein the high frequency pulses are at least 1000 pulses per second.

23. The process according to claim 16, wherein one or more component comprises a component in substantially purified form is selected from the group consisting of hemicellulose lignin, extractives and proteins, fibers, or any combination thereof.

24. The process according to claim 16, wherein the biomass is an herbal plant material.

25. The process according to claim 24, wherein the herbal plant material is selected from the group consisting of kava kava, echinacea, St. John's wort, valerian root, milk thistle seed, Siberian ginseng, nettle leaf, ginkgo, gotu kola, astragalus, goldenseal, dong quai, ginseng, bilberry, green tea, hawthorne, ginger, turmeric, black cohosh, cats claw, chamomile, dandelion, chaste tree berry, feverfew, garlic, horse chestnut, licorice, eyebright, yohimbe, and valerian poppy.

26. The process according to claim 16, wherein the one or more components in purified form are used to prepare polymers.

27. The process according to claim 16, wherein the one or more components in purified form are fermented to provide ethanol.

28. The process according to claim 16, wherein the one or more components in purified form are used to prepare coatings or adhesives.

29. The process according to claim 16, wherein the one or more components in purified form are used to prepare paper coatings, pulp, or paper.

30. The process according to claim 16, wherein the one or more components in purified form are used to prepare pulp for paper or chemical manufacture.

* * * * *